United States Patent [19]

Gaita

[11] Patent Number: 4,667,925
[45] Date of Patent: May 26, 1987

[54] QUICK COUPLING HOSE CONNECTION WITH DOUBLE ACTING BACKFLOW PREVENTING VALVE

[75] Inventor: Giorgio Gaita, Correggio Emilia, Italy

[73] Assignee: G.F. S.r.l., Correggio Emilia, Italy

[21] Appl. No.: 807,699

[22] Filed: Dec. 11, 1985

[30] Foreign Application Priority Data

Aug. 2, 1985 [IT] Italy .................. 34893/85[U]

[51] Int. Cl.⁴ .................................. F16L 29/00
[52] U.S. Cl. ...................... 251/149.1; 137/215; 137/533.25; 251/211
[58] Field of Search .......... 137/215, 533.25, 614.21; 251/149.1, 211

[56] References Cited

U.S. PATENT DOCUMENTS

| | | | |
|---|---|---|---|
| 2,102,774 | 12/1937 | Williams | 251/149.1 X |
| 2,833,301 | 5/1958 | Argus | 137/614.21 X |
| 2,849,208 | 8/1958 | Skipwith | 251/211 |
| 3,532,110 | 10/1970 | Peterson | 251/149.1 X |
| 3,961,645 | 6/1976 | Kagan | 251/149.6 X |
| 4,208,034 | 6/1980 | Ohlsson | 251/149.1 |
| 4,429,906 | 2/1984 | Spadotto et al. | |

Primary Examiner—Gerald A. Michalsky
Attorney, Agent, or Firm—Brisebois & Kruger

[57] ABSTRACT

An instant coupling comprises a male element (9) and a female element (1) which comprises a chamber (4) containing a valve (5) provided with a first sealing surface (10) which, when pressurized water is present, rests against a seat (12) and shuts-off water delivery when the male element (9) is not inserted, and a second sealing surface (11) below the first and arranged to rest against a respective seat (13) under the action of any momentary negative pressure arising in the water feed hose, in order to prevent undesirable fluids being drawn in when the male element is inserted.

3 Claims, 2 Drawing Figures

QUICK COUPLING HOSE CONNECTION WITH DOUBLE ACTING BACKFLOW PREVENTING VALVE

This invention relates to improvements in instant couplings for hoses in general, for example of the type described in U.S. application Ser. No. 807,698, filed Dec. 11, 1986, in the name of the present applicant, to which reference should be made for further details.

In this type of coupling, a mutually engageable and releasable male element and female element are provided, with the female element being fixed to the water feed hose, and the male element being connected to the water user device, such as an irrigator.

A valve of the mushroom type is provided in a compartment in the female element in order to shut off water delivery when the male element is withdrawn, the valve being depressed into the open position when the male element is inserted.

Basically, the valve contained in such couplings is able to shut the coupling off only in the water outlet direction. If the water feed hose is connected to a pipe which incorporates fire hydrants and/or nozzles for connecting to suction units, a negative pressure occurs along the pipe when these later are operated, and also propagates along said feed hose terminating in the coupling, to cause the valve in this latter to open, with simultaneous drawing-in of fluids such as air, foam, dirty water, detergents or any other fluid which at that moment is in proximity to the coupling.

The main object of the present patent is to provide and protect an improved coupling which obviates the aforesaid by means of a simple and rational structure.

According to the invention, the valve provided in an instant coupling of the aforesaid type comprises two opposing annular sealing surfaces arranged to cooperate with one or other of two respective seats provided in the compartment containing the valve. This latter is free to move between said two seats, and to seal either against the seat closer to that end of the coupling which is to house the male part, under the action of the water pressure, or against the seat closer to that end of the coupling which receives the hose, under the action of any negative pressure momentarily created within this latter. Said annular sealing surfaces can be in the form of rubber rings.

The objects of the invention are thus attained in that the shutoff valve shuts the coupling off even when the water feed pipe is under negative pressure.

The characteristics and constructional merits of the invention will be more apparent from the description given hereinafter with reference to the figures of the single accompanying drawing in which.

Figure 1:
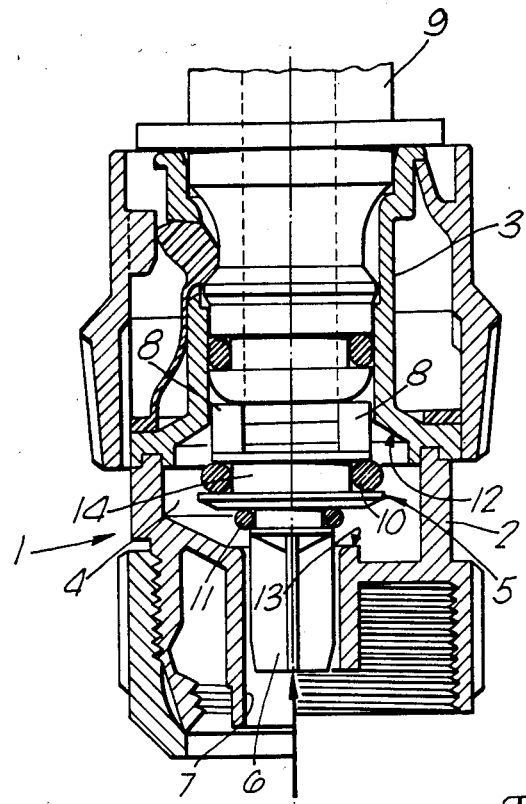
FIG. 1 is a longitudinal section through the invention on two orthogonal planes passing through the axis of the coupling, when in its normal state of use.

Said figures show a female element 1 comprising a portion 2 for connection to the hose, and a portion 3 for receiving the male element 9, both portions being of hollow cylindrical shape but of different cross-section.

Between the portions 2 and 3 there is defined a chamber 4 housing a valve 5 which can translate axially within said chamber guided by its axially grooved stem 6, which slides in a cylindrical portion 7.

Specifically, the valve structure comprises upper feet 8 under which there is a widened head 14. Said widened head 14 houses in suitable grooves an upper annular gasket 10 and an analogous lower gasket 11.

When the portion 2 is fed with water under pressure, and the male element 9 is withdrawn, the water pressure urges the valve 5 outwards until the gasket 10 seals against the valve seat 12, so that the water is unable to flow out (situation not shown on the drawings).

Figure 2:
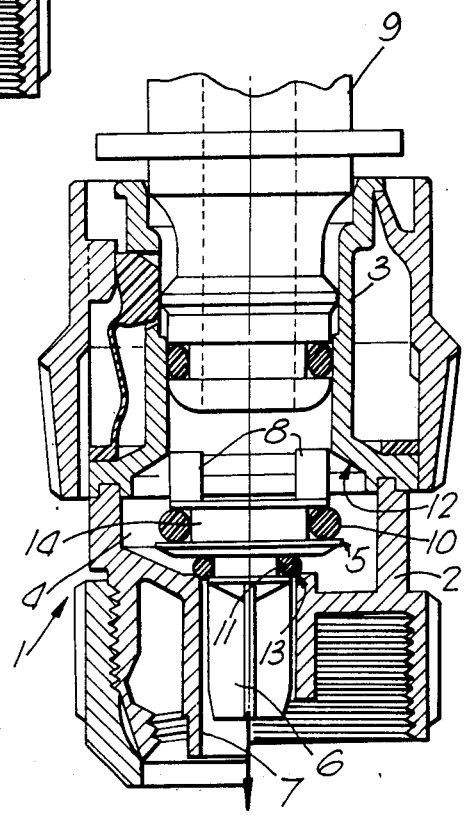
FIG. 2 is a view similar to the preceding, with the coupling shown in its non-use state and subjected to negative pressure through its water feed hose.

When the male element 9 is inserted, it acts against the feet 8 to cause the valve 5 to lower (see FIG. 1), thus allowing water delivery. If the water feed main (not shown) now goes into momentary negative pressure, the valve 5 lowers until the gasket 11 seals against the valve seat 13, to prevent undesirable fluids being drawn in (see FIG. 2).

Finally, it should be noted that the accompanying figures show two different known devices for locking the coupling to the water feed hose.

I claim:

1. A quick coupling connection of the type comprising a male element connected to the water using device and a female element for receiving the male element and connected to the water feed hose, said female element comprising, a tubular water inlet at one end of said female element, said inlet opening into a chamber in said female element, a water outlet in said chamber in opposed aligned relation to said water inlet, said outlet having a cylindrical interior for receiving the male element, said male element comprising a tubular element with a substantially open and unobstructed central mouth surrounded by a peripheral wall of the male element, a valve body within said chamber, said valve body having a stem extending into said inlet, spaced apart projections on said valve body, a first seal on said valve body for sealing against said outlet in response to pressurized water in said inlet, said projections extending toward said outlet and being disposed around said mouth of the male element for engagement by said peripheral wall, upon insertion of said male element, to move said valve body inwardly of the chamber and unseat said first seal to allow water to flow through the chamber and into the male element, and a second seal on said valve body facing toward said inlet and inwardly of said stem for sealing said inlet against reverse flow of liquid through said inlet in response to a negative pressure in the water feed hose.

2. A coupling according to claim 1 wherein, said valve body has a first annular groove and a second annular groove space from the first groove, said first seal comprises an elastic seal ring disposed in said first groove and said second seal comprises an elastic seal ring disposed in said second groove.

3. A coupling according to claim 1 wherein said first seal seats against a mouth of said outlet, and said second seal seats against a mouth of said inlet.

* * * * *